(No Model.)
A. MILLER.
HEADER.
No. 269,951. Patented Jan. 2, 1883.
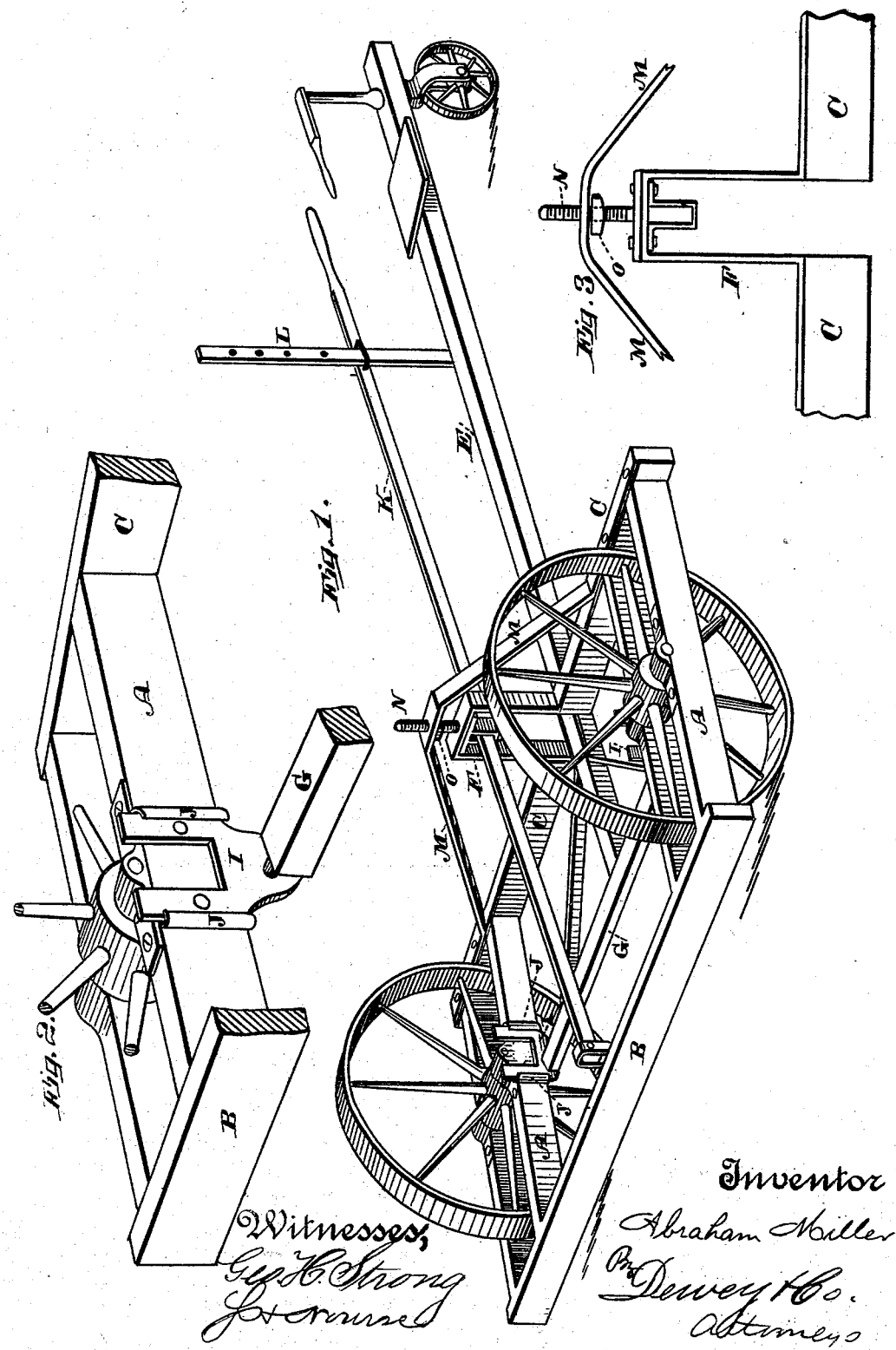

UNITED STATES PATENT OFFICE.

ABRAHAM MILLER, OF GRIDLEY, CALIFORNIA.

HEADER.

SPECIFICATION forming part of Letters Patent No. 269,951, dated January 2, 1883.

Application filed October 4, 1882. (No model.)

*To all whom it may concern:*

Be it known that I, ABRAHAM MILLER, of Gridley, county of Butte, State of California, have invented an Improved Header; and I hereby declare the following to be a full, clear, and exact description thereof.

My invention relates to certain improvements in headers; and it consists of the header-frame supported upon bearing-wheels in the usual manner, and having a tongue to which the team is attached. This tongue has its front end hinged or journaled to the lower part of the frame below the axes of the bearing-wheels, and may be raised or lowered at this point, the object being to relieve the raising and depressing lever from strain and to balance the action of the driving-gears, as will be more fully explained by reference to the accompanying drawings, in which—

Figure 1 is a view of my apparatus. Figs. 2 and 3 are enlarged views, showing construction.

A A are the side timbers, B the front and C the rear timber, of the frame; and D are the bearing-wheels, which have axles turning in boxes upon the frame, as shown. The rear timber, C, is divided at the center, so as to allow the pole or tongue E to pass through. A stout arch of iron, F, extends above the space formed by cutting the timber C, the ends being bolted to the top of the timber C, so as to make it rigid, while the arch allows sufficient space for the vertical movement of the pole. The pole or tongue has its rear end supported upon a steering-wheel in the usual manner, while the front end has the timber G fixed transversely across it, the ends of this timber having journals formed upon them to turn in bearings in the slide I, which bearings are below the line of the wheel-axles. The object of this is to more perfectly balance the frame and resist the tendency to throw the frame down in front, caused by the friction of the driving-gears, and also to overcome the tendency to cramp which occurs in the ordinary construction. When the front end of the pole is hinged to the rear frame-timber in the ordinary construction, if the frame is tilted either up or down, so as to form a considerable angle with the pole, it takes all the power which can be brought to bear upon it to return it to a position nearly in line with the pole. This is partly caused by the friction of the moving parts and the gearing by which they are driven, the tendency of which is to tilt the frame down to the front, and this is overcome by hinging the pole below the line of the wheel-axles, as I have shown.

The slides I move in vertical guides J to allow the journals of the pole to be moved to or from the wheel-axles, and thus regulate and adjust the balance of the machine.

The lever K, by which the front of the machine is elevated or depressed, passes through a slot or opening in the top of the arch F, and is pivoted to the front frame-timber, B.

The usual standard, L, and devices for holding the lever at any desired point are fixed to the pole within reach of the driver.

In order to strengthen the divided frame C, a strong iron strap, M, is bolted to the timber near the ends and passes over the top of the arch F a short distance above it. A screw, N, has one end fixed upon the top of the arch F and extends up through a hole made in the strap M. A nut, O, upon the screw below the strap may then be turned up, so as to produce any desired strain upon the frame, thus holding it rigidly in place.

By hinging the pole beneath the line of the bearing-wheel axles I not only balance the machine without the weights and springs which are ordinarily used, but I also overcome the twisting strain upon the frame, which takes place when the pole is hinged to the rear timber, and which arises when the machine is turned to one side or the other, because of the pole being supported upon a single wheel.

Having thus described my invention, what I claim as new, and desire to secure by Letters Patent, is—

1. The tongue or pole E, having the transverse shaft extending across its front end, said shaft being adapted to turn in bearings below the line of the wheel-axis, in combination with the guides J, in which the bearings may be elevated or depressed, substantially as herein described.

2. In a header having the pole or tongue hinged or journaled in a line beneath the bearing-wheel axles, the divided timber C, with the yoke or arch F, in combination with the strap M, the screw N, and nut O, substantially as herein described.

In witness whereof I hereunto set my hand.

A. MILLER.

Witnesses:
S. H. NOURSE,
G. W. EMERSON.